US010232722B2

(12) United States Patent
Ishigaki

(10) Patent No.: US 10,232,722 B2
(45) Date of Patent: Mar. 19, 2019

(54) SYSTEM, METHOD, AND APPARATUS FOR CONTROLLING OPERATION OF ENERGY MODULES OF AN ENERGY MANAGEMENT SYSTEM

(71) Applicant: TOYOTA MOTOR ENGINEERING & MANUFACTURING NORTH AMERICA, INC., Erlanger, KY (US)

(72) Inventor: Masanori Ishigaki, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 61 days.

(21) Appl. No.: 15/290,449

(22) Filed: Oct. 11, 2016

(65) Prior Publication Data

US 2018/0099568 A1   Apr. 12, 2018

(51) Int. Cl.

| | | |
|---|---|---|
| *B60L 11/18* | (2006.01) | |
| *B60S 5/06* | (2019.01) | |
| *H02K 7/108* | (2006.01) | |
| *H02K 9/06* | (2006.01) | |
| *H02K 7/14* | (2006.01) | |
| *H02K 11/33* | (2016.01) | |
| *G05D 1/02* | (2006.01) | |
| *H02P 27/06* | (2006.01) | |

(Continued)

(52) U.S. Cl.
CPC ......... *B60L 11/1822* (2013.01); *B60L 11/182* (2013.01); *B60L 11/1816* (2013.01);
(Continued)

(58) Field of Classification Search
CPC .................................................. B60L 11/1822
See application file for complete search history.

(56) References Cited

U.S. PATENT DOCUMENTS 7,423,402 B2   9/2008   Sano et al.
7,438,144 B2   10/2008   Chene et al.
(Continued)

FOREIGN PATENT DOCUMENTS

| DE | 10 2009 019 384 A1 | 11/2010 |
|---|---|---|
| FR | 2 989 522 A1 | 10/2013 |
| WO | WO 00/58139 A1 | 10/2000 |

OTHER PUBLICATIONS

English machine translation of FR2989522 published Oct. 18, 2013.*

*Primary Examiner* — Rexford Barnie
*Assistant Examiner* — David Shiao
(74) *Attorney, Agent, or Firm* — Oblon, McClelland, Maier & Neustadt, L.L.P.

(57) ABSTRACT

A system includes energy modules that output power to an energy management bus based on load demands. An energy module includes energy cells enclosed within a module housing that provide power to the energy management bus and rotation assemblies attached on opposite ends of the module housing that provide rotational movement for the energy module. The energy module includes a local controller that controls power output from the energy cells to the energy management bus, engages a self-driving mode in response to receiving a disconnection signal from a central controller, and controls movement of the energy module in the self-driving mode to a predetermined location via the first rotation assembly and the second rotation assembly. The central controller receives a current module status from the energy modules and controls a configuration of the energy modules providing power to the energy management bus based on the current module status.

19 Claims, 13 Drawing Sheets

(52) U.S. Cl.
CPC ....... *B60L 11/1829* (2013.01); *B60L 11/1838* (2013.01); *B60L 11/1864* (2013.01); *B60L 11/1877* (2013.01); *B60L 11/1879* (2013.01); *B60S 5/06* (2013.01); *H02K 7/108* (2013.01); *H02K 7/14* (2013.01); *H02K 9/06* (2013.01); *H02K 11/33* (2016.01); *B60L 2260/32* (2013.01); *G05D 1/021* (2013.01); *H02K 2213/12* (2013.01); *H02P 27/06* (2013.01)

(56) References Cited

U.S. PATENT DOCUMENTS

| | | | |
|---|---|---|---|
| 2002/0114983 | A1 | 8/2002 | Frank et al. |
| 2009/0082957 | A1* | 3/2009 | Agassi ...................... B60L 3/12 |
| | | | 701/532 |
| 2009/0198372 | A1* | 8/2009 | Hammerslag ....... B60L 11/1822 |
| | | | 700/226 |
| 2010/0071979 | A1* | 3/2010 | Heichal ................... B60K 1/04 |
| | | | 180/68.5 |
| 2011/0084658 | A1* | 4/2011 | Yamamoto .............. B60L 5/005 |
| | | | 320/108 |
| 2012/0286730 | A1 | 11/2012 | Bonny |
| 2014/0002019 | A1* | 1/2014 | Park ........................ B60L 11/00 |
| | | | 320/109 |
| 2015/0280465 | A1* | 10/2015 | Lin .......................... H02J 7/007 |
| | | | 320/137 |
| 2015/0298811 | A1 | 10/2015 | Knepple et al. |
| 2016/0221543 | A1* | 8/2016 | Corfitsen ................. B60S 5/06 |
| 2016/0368464 | A1* | 12/2016 | Hassounah ............... B60S 5/06 |
| 2017/0151881 | A1* | 6/2017 | Lee ...................... B60L 11/1822 |
| 2017/0174092 | A1* | 6/2017 | Kohnke ............. B60L 11/1822 |
| 2017/0371331 | A1* | 12/2017 | Cameron ............. G05D 1/0016 |

\* cited by examiner

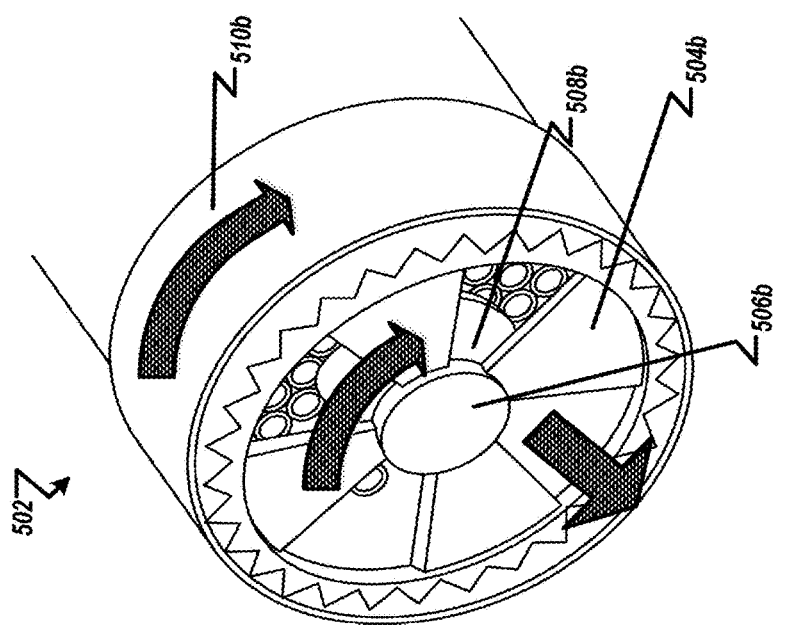
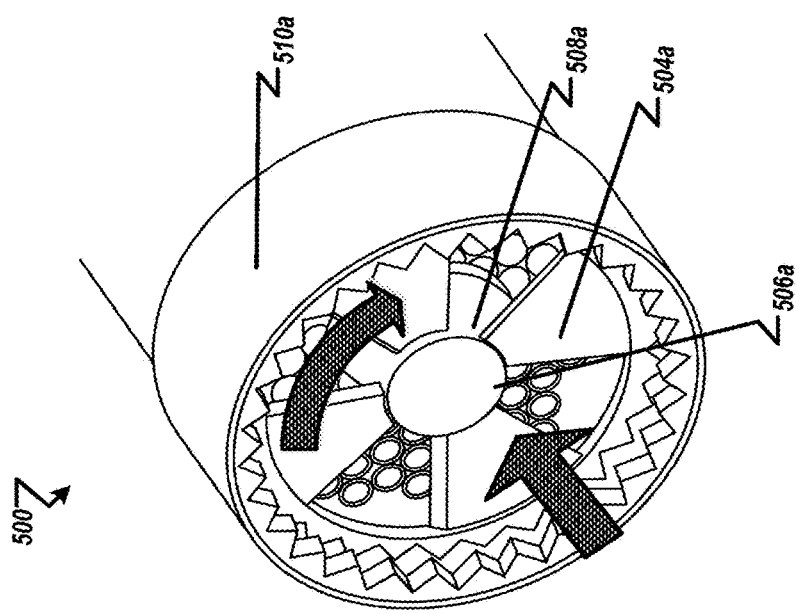
FIG. 5

SYSTEM, METHOD, AND APPARATUS FOR CONTROLLING OPERATION OF ENERGY MODULES OF AN ENERGY MANAGEMENT SYSTEM

BACKGROUND

Energy management systems in hybrid vehicles (HVs) and electric vehicles (EVs) include energy modules that provide power to a vehicle drive train and electric loads of the vehicle. U.S. Patent Application Publication 2012/0286730 to Bonny describes an automatic recharging robot for electric and hybrid vehicles that is housed in an underside of a vehicle and is configured to automatically navigate to a detected compatible recharging station.

SUMMARY

In an exemplary implementation, a system can include energy modules that output power to an energy management bus based on load demands. An energy module can include energy cells enclosed within a module housing that provide power to the energy management bus and rotation assemblies attached on opposite ends of the module housing that provide rotational movement for the energy module. The energy module can include a local controller that controls power output from the energy cells to the energy management bus, engages a self-driving mode in response to receiving a disconnection signal from a central controller, and controls movement of the energy module in the self-driving mode to a predetermined location via the first rotation assembly and the second rotation assembly. The central controller can receive a current module status from the energy modules and control a configuration of the energy modules providing power to the energy management bus based on the current module status.

The first rotation assembly and the second rotation assembly can include a motor configured to receive electrical power from the one or more energy cells; a fan coupled to the motor that is configured to provide air flow to the energy module in response to rotation of the motor; and a wheel assembly that is detachably coupled to the motor via a clutch mechanism configured to provide the rotational movement of the energy modules in response to the rotation of the motor. The system can disconnect the wheel assembly from the motor via the clutch mechanism when the energy module is not in the self-driving mode.

The system can output a replacement status signal to the central controller in response to determining that current module status of the energy module meets one or more replacement criteria. The one or more replacement criteria can include at least one of a predetermined state of charge (SOC) threshold or a predetermined state of health (SOH) threshold for the one or more energy cells.

The system can engage a navigation sub-mode of the self-driving mode wherein the first circuitry is further configured to navigate the energy module to the predetermined location that corresponds to a charging station location. The system can also determine the charging station location based on location data received from the second circuitry of the central controller. The system can also determine the charging station location based on a beacon signal received from the charging station.

The system can also include a module chassis configured to hold the one or more energy modules at one or more docking positions within the module chassis. The one or more docking positions can include at least one electrical terminal configured to electrically connect the one or more energy modules to the energy management bus. The at least one electrical terminal can a wireless power transceiver configured to wirelessly transfer power between the one or more energy modules and the energy management bus. The central controller can control a position of a door of the module chassis. The central controller can also output the disconnection signal to the one or more energy modules in response to determining that the door of the module chassis is in an open position. The door of the module chassis can provide a driving surface between the module chassis and the predetermined location for the one or more energy modules operating in the self-driving mode when the door is in an open position. The system can engage a repositioning sub-mode of the self-driving mode wherein the first circuitry is further configured to navigate the energy module to the predetermined location that corresponds to a second docking position within the module chassis and can also navigate the energy module to the second docking position within the module chassis based on a beacon signal received from the second docking position.

The central controller can determine the predetermined location to which the energy module navigates based on charging/replacement location information received from a cloud-based energy module monitoring system.

The system can output firmware updates to the one or more energy modules in response to receiving the firmware updates from a cloud-based energy module monitoring system.

A process includes controlling, via first circuitry of a local controller, an amount of power output from one or more energy cells enclosed within a module housing of an energy module of one or more energy modules to an energy management bus of an electrical system; engaging, via the first circuitry, a self-driving mode of the energy module in response to receiving a disconnection signal from a central controller; controlling, via the first circuitry, movement of the energy module in the self-driving mode to a predetermined location via a first rotation assembly and a second rotation assembly attached on opposite ends of the module housing that are configured to provide rotational movement for the energy module; receiving, at second circuitry of a central controller, a current module status from the one or more energy modules; and controlling a configuration of the one or more energy modules providing power to the energy management bus based on the current module status received from the one or more energy modules.

An energy module includes one or more energy cells enclosed within a module housing configured to provide power to an energy management bus; a first rotation assembly and a second rotation assembly attached on opposite ends of the module housing that are configured to provide rotational movement for the energy module; and a local controller with first circuitry configured to control an amount of power output from the one or more energy cells to the energy management bus, engage a self-driving mode of the energy module in response to receiving a disconnection signal from a central controller, and control movement of the energy module in the self-driving mode to a predetermined location via the first rotation assembly and the second rotation assembly.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5 is an exemplary illustration of a rotation assembly of an energy module;

DETAILED DESCRIPTION

Figure 1:
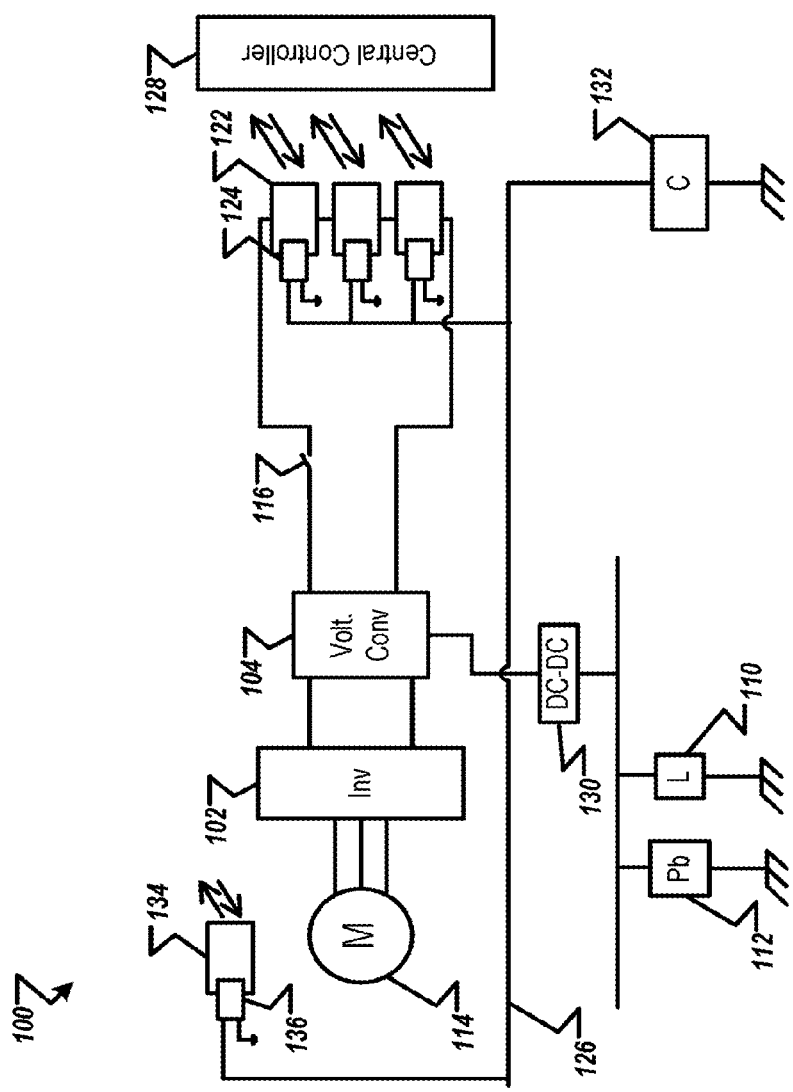
FIG. 1 is an exemplary schematic diagram of a modular energy management system.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

FIG. 1 is an exemplary illustration of a modular energy management system 100 that can be implemented in a hybrid vehicle (HV) or electric vehicle (EV). The energy management system 100 controls transfer of electric energy from one or more energy sources to an inverter 102 and motor 114 as well as one or more electrical loads 110 of the vehicle. Throughout the disclosure, the inverter 102 and motor 114 are interchangeably referred to as the vehicle drive train. The modular energy management system 100 includes at least one battery module 122 that provides power to inverter 102 and motor 114 via voltage converter 104 and high voltage relay 116. In some implementations, the high voltage relay 116 includes at least one switch aligns power to the vehicle drive train based on a control signal from a central controller 128. In addition, the at least one battery module 122 is an energy module that includes at least one battery cell, a local controller, and a modular isolated DC-DC converter 124 that converts the DC voltage from the battery module 122 to an energy management bus 126. In some implementations, the modular isolated DC-DC converter 124 converts a higher DC voltage at the at least one battery module 122 to a lower voltage at an energy management bus 126. The modular isolated DC-DC converter 124 can be part of the battery module 122 or can be external to the battery module 122. In addition, the modular isolated DC-DC converter 124 can be configured for wireless power transfer so that power can be wirelessly transferred between the at least one battery module 122 and the energy management bus 126. The at least one battery module 122 can be connected in series or parallel based on the power specifications of the modular energy management system 100.

The central controller 128 and local controllers for each of the at least one battery module 122 manage the power output from the at least one battery module 122 as well as power demands of the one or more electrical loads 110 to provide droop control for the energy management bus 126. In addition, the local controllers for the at least one battery module 122 communicate information to the central controller 128 that includes diagnostic information, state of charge (SOC), rate of discharge, and the like. Details regarding operation of the central controller 128 and local controllers are discussed further herein.

In some implementations, the energy management bus 126 is a DC bus that connects the at least one battery module 122 to the one or more electrical loads 110 via a DC-DC converter 130. In some aspects, the DC-DC converter 130 is a non-isolated DC-DC converter that can perform DC-DC conversion at higher speeds than isolated DC-DC converters. The DC-DC converter 130 can convert a higher DC voltage at the energy management bus 126 to a lower voltage that corresponds to the voltage of the one or more electrical loads 110.

In addition, a power storage device 132 is also connected to the energy management bus 126. In some implementations, the power storage device 132 can be a capacitor, an electric double layer capacitor (EDLC), a lithium-ion capacitor, or any other type of power storage device. The type of power storage device 132 used in the modular energy management system 100 can be based on rates of power transfer and how much of an effect power transients have on the energy management bus 126. The power storage device 132 can reduce the effects of power transients that occur at the energy management bus 126 and assist in maintaining an approximately constant average voltage at the energy management bus 126. In some aspects, the effects of power transients on the energy management bus 126 can be referred to as "peaky power." By reducing the effects of peaky power on the energy management bus 126, the power storage device 132 reduces stresses on the at least one battery module 122 and the Pb battery 112.

For example, power demands of the one or more electrical loads 110 can vary based on the number of energized loads, load settings, and the like. As the load demands on the modular energy management system 100 change, a response time by the modular isolated DC-DC converter 124 of the at least one battery module 122 that is slower than the increase in load demand may cause power transients to develop at the energy management bus 126. Stored energy from the power storage device 132 can be output to reduce the magnitude of the power transients. The power storage device 132 can also absorb excess power as load demands on the modular energy management system 100 are reduced. The modular energy management system 100 also includes a lead (Pb) battery 112 that also supplies power to the one or more electrical loads 110. In some implementations, the modular energy management system 100 also includes the solar energy module 134 that is connected to the energy management bus 126 via the modular DC-DC converter 136. In some implementations, the modular DC-DC converter c136 can be configured to perform wireless power transfer. The solar energy module 134 can provide power to the one or more electrical loads 110 via the DC-DC converter 130.

Figure 2:
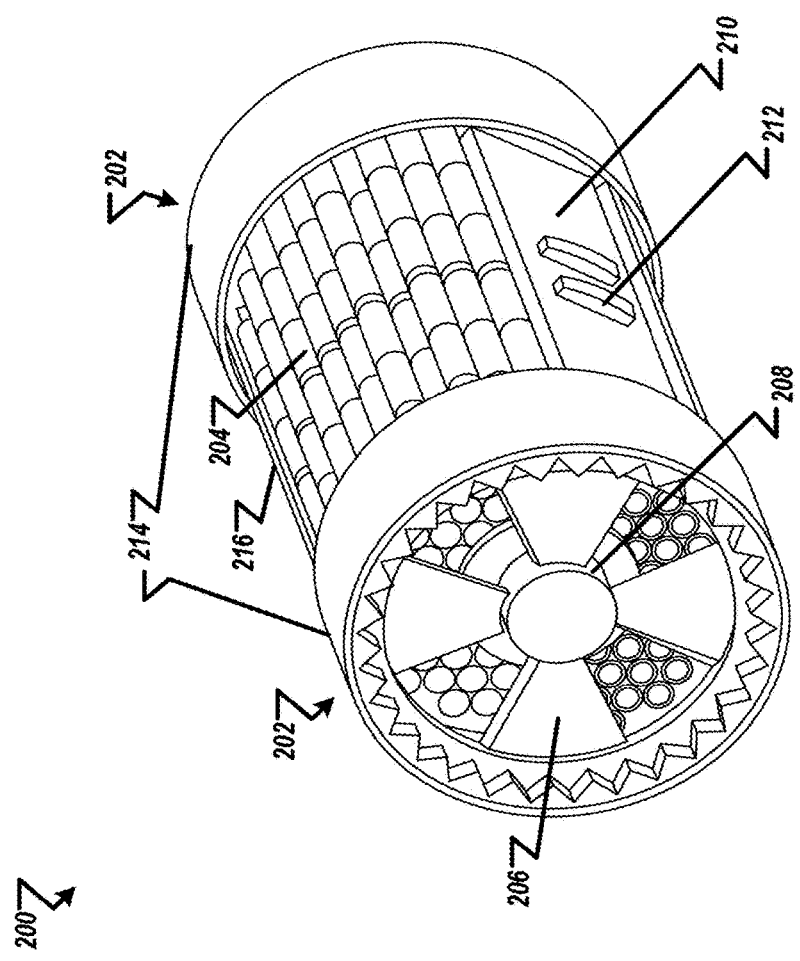
FIG. 2 is an exemplary illustration of an energy module.

FIG. 2 is an exemplary illustration of an energy module 200 that provides power to the modular energy management system 100. For example, the energy module 200 can be an implementation of the battery module 122 described previously (FIG. 1). The energy module 200 includes one or more electrically connected energy cells, such as battery cells 204. In one implementation, the battery cells 204 are 18650 lithium-ion cells, and the energy module 200 includes 672 battery cells in a 56-parallel, 12-series configuration. The battery cells 204 are housed in a module housing 216 of the energy module 200, which has a cylindrical shape according to one example. The battery cells 204 can also be aligned in other electrical configurations and can be implemented with other types of battery or energy cells. In addition, the module housing 216 can have other shapes besides the cylindrical shape, such as square, rectangular, oval, etc. The weight and volume of the energy module 200 less than conventional energy module configurations and also have increased range.

The energy module 200 also includes rotation assemblies 202 that are connected to opposite surfaces of the module housing 216 that stores the battery cells 204. In the case of a cylindrical module housing 216, the rotation assemblies 202 are connected to flat surfaces on each end of the module housing 216. Each rotation assembly 202 includes a motor 208 that is coupled to a fan 206 and a wheel assembly 214. As the motor 208 rotates, the fan 206 provides cooling air flow to the battery cells 204 within the module housing 216. In addition, the wheel assembly 214 is detachably coupled to the motor 208 to provide rotational movement for the energy module 200. A clutch mechanism connects or disconnects the wheel assembly 214 from the motor 208. Details regarding the operation of the rotation assemblies 202 are discussed further herein.

The energy module 200 also includes a controller 210 with suitable logic and circuitry that locally controls operations of the energy module 200. References to various types of circuitry of the controller 210 (e.g., monitoring circuitry, communication circuitry, power transfer circuitry, drive control circuitry, etc.) refer to software instructions stored in memory that are executed by a processor of the controller 210. The controller 210 can be referred to interchangeably as a local controller.

For example, the controller 210 includes monitoring circuitry that receives sensor data from one or more sensors installed in the energy module 200 that can include voltage sensors, current sensors, temperature sensors, and any other type of sensor that allows the controller 210 to determine a current status of the energy module 200. For example, the current status on the energy module 110 can include a state of charge (SOC), state of health (SOH), or current operation mode of the energy module 200. In some implementations, the SOH of the energy module 200 is percentage indicating how close various measured parameters correspond to specifications of the energy module 200. For example, the measured parameters that are used to determine the SOH can include internal impedance (e.g., resistance, inductance, or capacitance), capacity, voltage, self-discharge, ability to accept a charge, or number of charge-discharge cycles that have been performed.

In some aspects, the controller 210 of the energy module 200 outputs a replacement status signal to a central controller 128 of the modular energy management system 100 (e.g., central controller 128 in FIG. 1) when predetermined replacement criteria for the energy module 200 are met. The predetermined replacement criteria can include a predetermined SOC threshold or SOH threshold. For example, the controller 210 outputs the replacement status signal to the central controller 128 when the SOC of the energy module 200 is less than the SOC threshold. In addition, the controller 210 can output the current status of the energy module 110 to the central controller 128 at a predetermined frequency, and the central controller 128 can determine when the predetermined replacement criteria are met.

The controller 210 also includes communication circuitry that allows the controller 210 to communicate with other devices, such as the central controller 128 of the modular energy management system 100, a cloud-based module monitoring system, a charging station, other energy modules, or a module chassis that stores at least one of the energy module 200 and connects the at least one energy module to the modular energy management system 100. The communication circuitry can include transceivers, antennas, and associated circuitry that provide for wireless communication between the controller 210 and the other devices via one or more wireless communication protocols. The wireless communication protocols can include WI-FI, cellular communication (e.g., 3G, 4G, LTE, GSM, etc.), Bluetooth, Bluetooth low energy (BLE), or any other wireless communication technology that is known. For example, the controller 210 can locate a position of a charging station by establishing a Bluetooth or BLE link with the charging station. In addition, the controller 210 can communicate with the cloud-based module monitoring system via a cellular network connection.

The controller 210 also includes power transfer control circuitry that control transfer of energy out of or into the battery cells 204 of the energy module 200. In some implementations, the energy module 200 has a corresponding DC-DC power conversion circuit (e.g., modular isolated DC-DC power converter 124 in FIG. 1) that transfers energy between energy modules or between the energy management bus (e.g., energy management bus 126 in FIG. 1) and the energy module 200. The controller 210 of the energy module 200 can output control signals to the DC-DC power conversion circuit to control a direction of power transfer and a rate of power transfer based on the current status of the energy module 200 or a control signal received from the central controller 128. In some implementations, the energy module 200 includes electrical terminals 212 that electrically connect the energy module 200 to the energy management bus. In some aspects, the terminals 212 include a wireless power transceiver that provides for wireless power transfer between the energy module 200 and the energy management bus.

The controller 210 also includes drive control circuitry that controls the operation of the rotation assemblies 202 as well as self-navigation of the energy module 200. In some implementations, the controller 210 is configured to determine an operational mode for the energy module 200 based on control signals received from the central controller 128 of the energy management system 100, detected beacon signals from charging stations, etc. For example, one operational mode of the energy module 200 is a self-driving mode where the controller 210 navigates the energy module 200 to a predetermined location. Throughout the disclosure, references to navigating or navigation of the energy module 200 refer to independent control of movement of the energy module 200 by the controller 210 that can include determining a direction and speed of motion and controlling operation of the rotation assemblies 202 to achieve the determined direction and speed of motion. In a navigation sub-mode of the self-driving mode, the controller 210 navigates the energy module 200 to a charging station or a location other than the module chassis. In a repositioning sub-mode of the self-driving mode, the controller 210 navigates the energy module 200 to another docking position within the module chassis. The controller 210 can also operate the energy module 200 in other operational modes, such as a power transfer mode or a charging mode. The controller 210 also outputs control signals to actuators that control the rotation assemblies 202, such as actuators that control clutch engagement, and/or rotation speed of the motor 208, steering of the energy module 200 based on the operational mode and a predetermined location to which the energy module 200 is navigating, such as a charging station or other docking position location within the module chassis. Details regarding the operation of the energy module 200 in the various operational modes are discussed further herein.

The controller 210 and thus the energy module 200 can operate independently of the central controller 128 of the energy management system 100, which provides flexibility with respect to changing out energy modules for charging operations, using the energy module 200 for multiple applications, and the like. For example, the energy module 200 can provide power to other types of energy management systems, such as electric systems of small vehicles or buildings. Throughout the disclosure, several implementations of the energy module 200 are described. It can be understood that other references to energy modules herein (e.g., energy modules 300, 608, 612, 614, 616, 704, 802) include the components of the energy module 200 and can be referred to interchangeably with the energy module 200.

Figure 3:
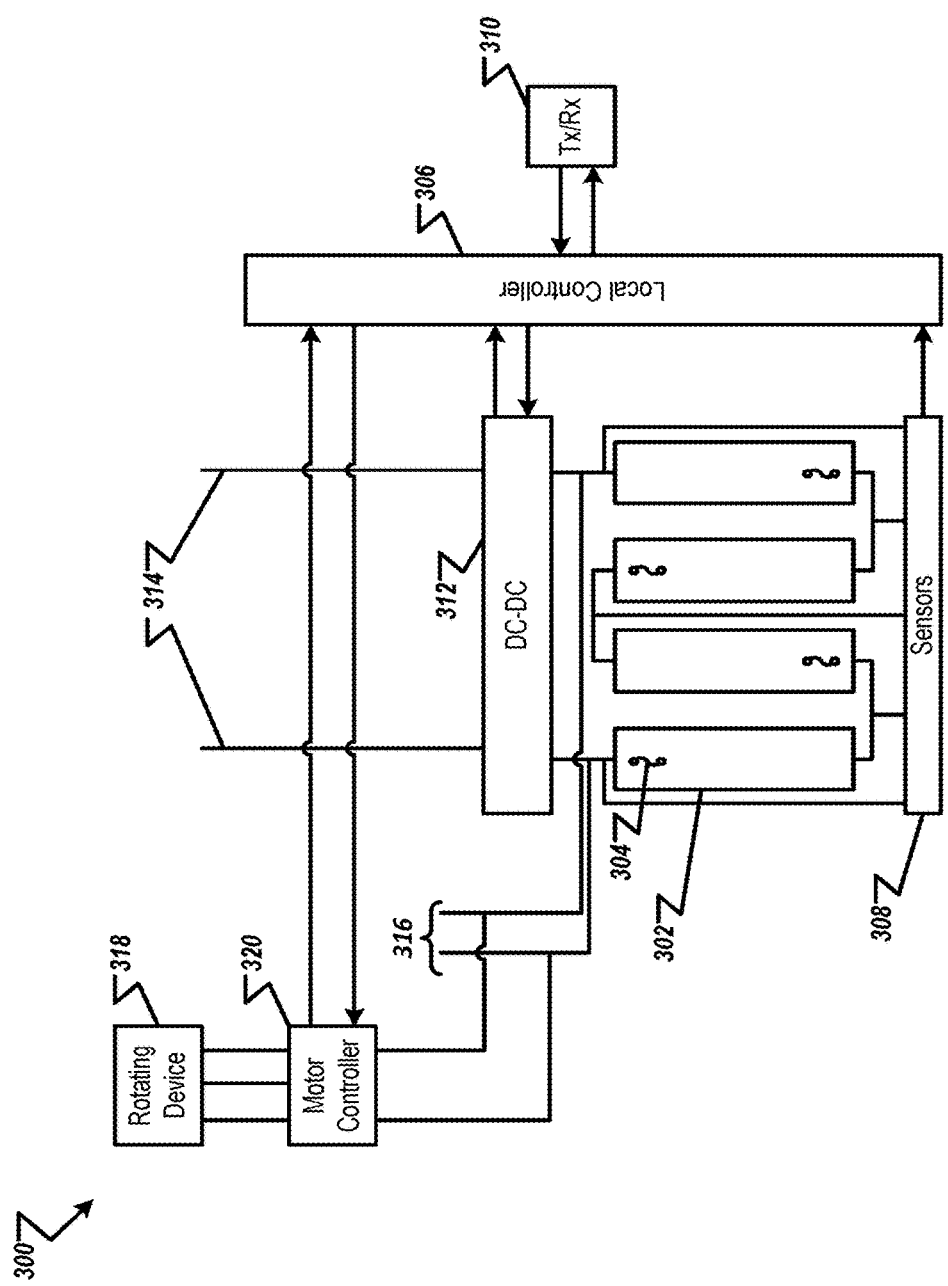
FIG. 3 is an exemplary schematic diagram of an energy module.

FIG. 3 is an exemplary electrical schematic diagram energy module 300, which is an implementation of the energy module 200 described previously. The energy module 300 described by FIG. is a battery module, such as the battery module 122 in the modular energy management system 100. Energy modules having other types of power sources can also be included in the modular energy management system 100. For example, solar energy modules, AC charging modules, fuel cell modules, and the like, are other types of energy modules that can be included in the modular energy management system 100. The energy module 300 includes at least one source cell 302, such as a battery cell (e.g., battery cell 204 in FIG. 2), a modular DC-DC converter 312, a local controller 306 with a transceiver 310, and sensor devices 308. In some implementations, the modular DC-DC converter 312 is included as part of the energy module 300, but can also be external to the energy module 300.

In some implementations, the local controller 306 is an implementation of the controller 210 described previously (FIG. 2). The power transfer circuitry of the local controller 306 receives voltage-power (V-P) maps and other information from the central controller 128 of the modular energy management system 100 that indicates how energy module 300 is configured and operates with respect to the modular energy management system 100. The local controller 306 also reads the voltage at an energy management bus, and issues control signals to align the modular DC-DC converter 312 to achieve an output power that corresponds to the received V-P map. The modular DC-DC converter 312 can be an isolated or a non-isolated DC-DC converter. The local controller 306 also receives sensor values from at least one sensor device 308 that can include temperature, voltage, current, SOC, SOH, and other indications related to the at least one source cell 302. The at least one sensor device can also determine if at least one fuse 304 within the at least one source cell 302 has received a trigger event to shut down the at least one source cell 302. For example, the at least one internal fuse 304 can be set to trip on overcurrent, high temperature, overload, and the like. In some implementations, the local controller 306 includes a memory to save the V-P map information received from the central controller 128 and the sensor values received from the at least one sensor device 308.

The local controller 306 communicates with the central controller 128 of the modular energy management system 100 via transceiver 310 and associated communication circuitry. The transceiver 310 can include at least one transmitter and receiver antenna to receive signals from the central controller 128 and transmit signals to the central controller 128. For example, the local controller 306 can transmit diagnostic information via the transceiver 310 to the central controller 128 related to the energy module 300 and can receive V-P map information from the central controller 128. The transceiver can also be implemented as separate transmitter and receiver devices according to some implementations. The local controller 306 can also communicate with other devices via one or more wireless communication protocols. The wireless communication protocols can include WI-FI, cellular communication (e.g., 3G, 4G, LTE, GSM, etc.), Bluetooth, Bluetooth low energy (BLE), or any other wireless communication technology that is known. For example, the local controller 306 can locate a position of a charging station by establishing a Bluetooth or BLE link with the charging station. In addition, the local controller 306 can communicate with the cloud-based module monitoring system via a cellular network connection.

Output signal 314 from the modular DC-DC converter 310 is sent to the energy management bus to maintain continuous power to one or more electrical loads of the modular energy management system 100. In some implementations, a high voltage output signal 316 can be output from the energy module 300 upstream of the DC-DC converter 312 to provide power to the vehicle drive train. For example, the high voltage output signal 316 can be connected in series with high voltage output signals from other energy modules to provide power to the vehicle drive train components. In addition, the high voltage output signal can provide power to a motor controller 320, which provides power to a rotation device 318, such as the motor 208 associated with the rotation assemblies 202 (FIG. 2) of the energy module 200. Also, the local controller 306 outputs control signals to the motor controller 320 to control the speed and direction of rotation of the rotating device 318.

Figure 4:
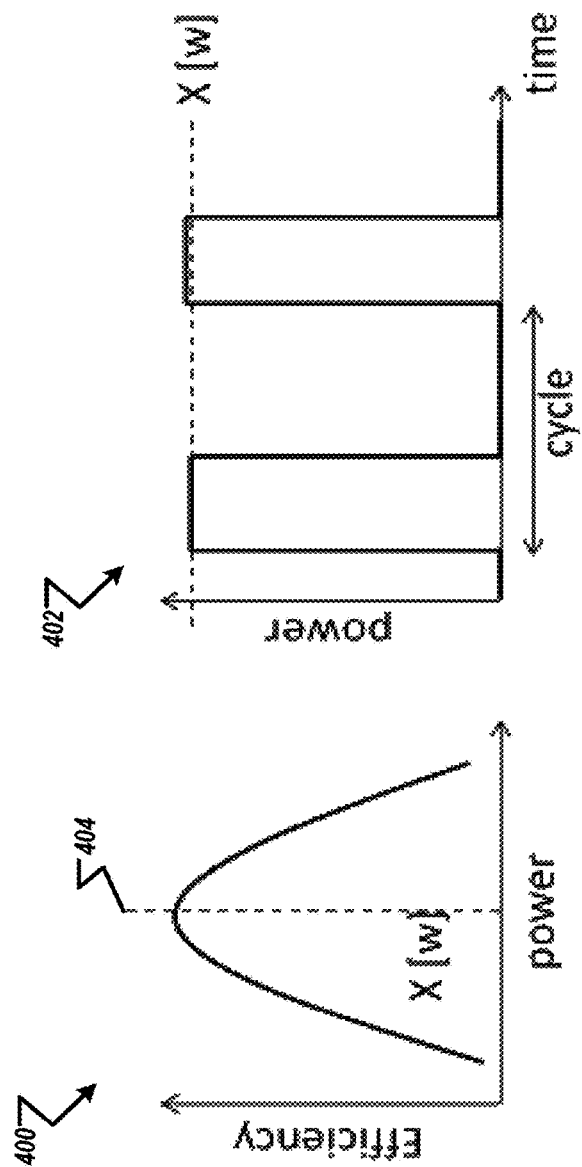
FIG. 4 is an exemplary graph of output power and efficiency for an energy module.

FIG. 4 includes exemplary graphs of efficiency 400 and output power 402 for an energy module, such as the energy module 300 (FIG. 3). In some implementations, the local controller 306 can control an amount of power output by the energy module 300 based on an efficiency profile for the energy module, which may be stored in the memory of the local controller 306. The energy module 300 can be configured to output a predetermined amount of power that corresponds to a highest operating efficiency for the energy module 300, such as at point 404 of the graph 400. The graph 402 illustrates how the local controller 306 can be configured to implement duty cycle control to modify the amount of power output from the energy module 300 to be as close to the highest operating efficiency for the energy module 300 as possible. Using duty cycle control to modify the amount of output power can be beneficial in wireless power transfer implementations where magnetic resonance wireless power transfer devices operate with sharp efficiency curves.

FIG. 5 is an exemplary illustration of rotation assemblies 500 and 502 of an energy module 200, which are implementations of the rotation assemblies 202 (FIG. 1). For example, rotation assembly 500 includes wheel assembly 510a that is disconnected from motor 506a. When the energy module 200 is in a power transfer mode or a charging mode, clutch mechanism 508a disconnects the wheel assembly 510a from the motor 506a so that the wheel assembly 510a remains stationary. As the motor 506a rotates, only fan 504a, which is coupled to the motor 506a rotates to provide cooling air flow to the battery cells 204 of the energy module 200. Rotation assembly 502 includes wheel assembly 510b that is coupled to the motor 506b. When a self-driving mode of the energy module 200 is engaged, the controller 210 of the energy module 200 outputs a control signal that causes clutch mechanism 508b to connect the wheel assembly 510b to the motor 506b so that the energy module 200 moves as the motor 506b spins while fan 504b also rotates. Combining the wheel assembly 510a,b and fan 504a,b into a single rotation assembly 500, 502 reduces an overall weight of the energy module 200 and reduces a total number of components.

Figure 6:
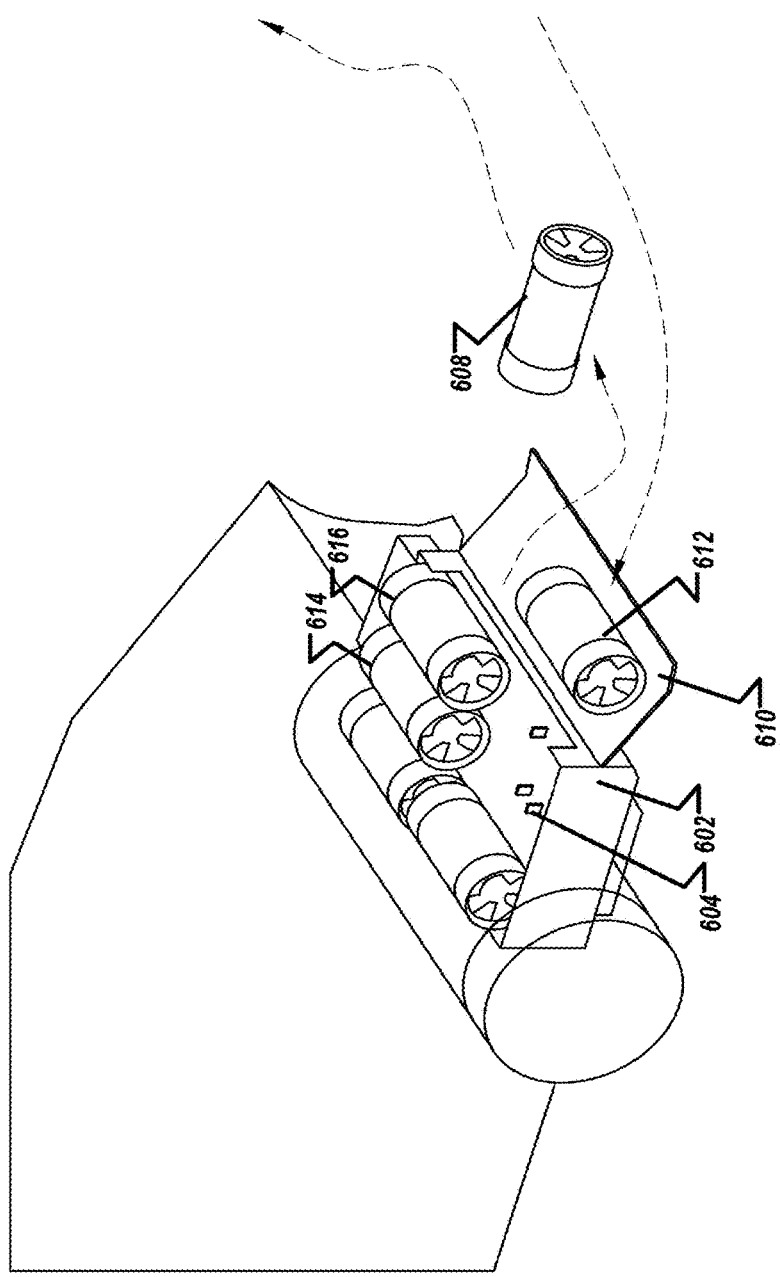
FIG. 6 is an exemplary illustration of energy modules in a module chassis of a vehicle.

FIG. 6 is an exemplary illustration of a module chassis 602 of a vehicle 600 with a modular energy management system 100, such as the modular energy management system 100 described previously (FIG. 1). The module chassis 602 can be installed in the vehicle 600, such as in an aft portion of a vehicle undercarriage or in a trunk space of the vehicle 600. The module chassis 602 includes one or more docking positions for the energy modules (e.g., energy module 200 in FIG. 2) of the modular energy management system 100. For example, the module chassis 602 has six docking positions that house six energy modules. In some implementations, each of the docking positions in the module chassis 602 include one or more electrical terminals 604 that electrically connect the one or more energy modules to the energy management bus of the modular energy management system 100. In some implementations, the electrical terminals 604 provide a wired connection between the energy modules and the energy management bus. The electric terminals 604 can also include a wireless power transceiver configured to wirelessly transfer power between the one or more energy modules and the energy management bus in addition to or instead of the wired connection. The electric terminals 604 also include circuitry for communicating with the central controller 128 as well as the energy modules. For example, the electric terminals 604 can output a Bluetooth or BLE beacon signal that is detected by the energy modules navigating to a predetermined docking position in the module chassis 602.

The module chassis 602 also includes a door 610 that is automatically controllable by the central controller 128 of the modular energy management system 100. For example, the central controller 128 can output a control signal to engage an actuator to open the door 610 based on predetermined opening criteria. For example, the predetermined opening criteria can include receiving a module replacement signal from one of the energy modules, determining that the vehicle 600 is within a predetermined distance of a module charging station, and determining that the vehicle 600 is in a parked state or the engine is off, the central controller 128 issues a control signal to open the door 610 of the module chassis 602. When in an open position, the door 610 provides a driving surface between the module chassis 602 and a predetermined location for the one or more energy modules operating in the self-driving mode, such as a module charging station. In addition, the central controller 128 outputs a control signal to engage an actuator to close the door 610 based on predetermined closing criteria. The predetermined closing criteria can include determining that a predetermined number of energy modules are in one or more of the docking positions and are electrically connected to the energy management bus via the electric terminals 604.

In some aspects, in response to determining that the door 610 of the module chassis 602 has reached the open position, the central controller 128 can output control signals to the energy modules to configure the energy management system 100 for module replacement and/or repositioning. For example, if energy module 608 has met the predetermined replacement criteria, the door 610 of the module chassis 302 is open, and the modular energy management system 100 has been configured for standby operations, the central controller 128 issues the disconnection signal to the energy module 608 along with a control signal to engage a self-driving mode in order to navigate to a charging station. In response to receiving the control signals, the energy module 608 disconnects from the energy management bus 126 and engages the navigation sub-mode of the self-driving mode.

In the navigation sub-mode, the local controller of the energy module 608 receives location information about the charging station or other predetermined location which the energy module 608 is navigating. The location information can include a detected beacon signal from the charging station that the energy module 608, a control signal received from the central controller 128 about the position of the charging station, and/or position coordinates of the charging station received from the central controller 128 or cloud-based energy module monitoring system. In some implementations, the local controller of the energy module includes positioning circuitry, such as a global positioning system (GPS) receiver that allows the local controller to determine the location of the charging station based on the received position coordinates. When the self-driving mode is engaged, the local controller issues control signals to the clutch mechanisms of the rotation assemblies (e.g., rotation assemblies 202 in FIG. 2) to connect the motor to the wheel assembly. The local controller also controls the speed and direction of rotation of each of the rotation assemblies in order to steer the energy module 608 to the charging station or other predetermined location.

Energy module 612 represents an energy module operating in the self-driving mode that is navigating to one of the docking positions in the module chassis 602. For example, the energy module 612 may be a replacement energy module and/or charged energy module that is navigating to module chassis 602 from the charging station. The energy module 612 also navigates to the module chassis 602 based on received location information about the module chassis 602 and/or predetermined docking position to which the energy module 612 is assigned. In some implementations, the central controller 128 determines the predetermined docking position for the energy module 612 based on a current module status of other energy modules providing power to the energy management system 100 as well as power demands of the electrical loads supplied by the modular energy management system 100. When the predetermined docking position is determined, the central controller 128 outputs a control signal to trigger the electric terminals 604 of the predetermined docking position to output a beacon signal that is detected by the energy module 612. The local controller 210 of the energy module 612 controls navigation of the energy module 612 to the predetermined docking position based on the detected beacon signal from the electric terminals for the predetermined docking position. Once the energy module 612 has reached the predetermined docking position, the energy module 612 is electrically connected to the energy management bus 126 via the electric terminals 604.

Based on the configuration of the energy modules in the module chassis 602, one or more of the energy modules may have to be repositioned within the module chassis 602 in order to provide a path for another energy module to navigate out of the module chassis 602 or into a predetermined docking position in the module chassis 602. For example, if energy module 614 has met the predetermined replacement criteria and has received the disconnection signal from the central controller 128, then the central controller 128 also outputs a repositioning control signal to energy module 616 in order to provide a path of travel for the energy module. For example, in response to receiving the repositioning control signal, the energy module 616 engages a repositioning sub-mode of the self-driving mode. While in the repositioning sub-mode, the energy module 616 exits the module chassis 602 via the driving surface provided by the door 610 and subsequently navigates back to a predetermined docking position in the module chassis 602 once the energy module 614 has exited the module chassis 602. The energy modules stored in the module chassis 602 can also be manually removed/disconnected or replaced/connected from the module chassis 602.

Figure 7:
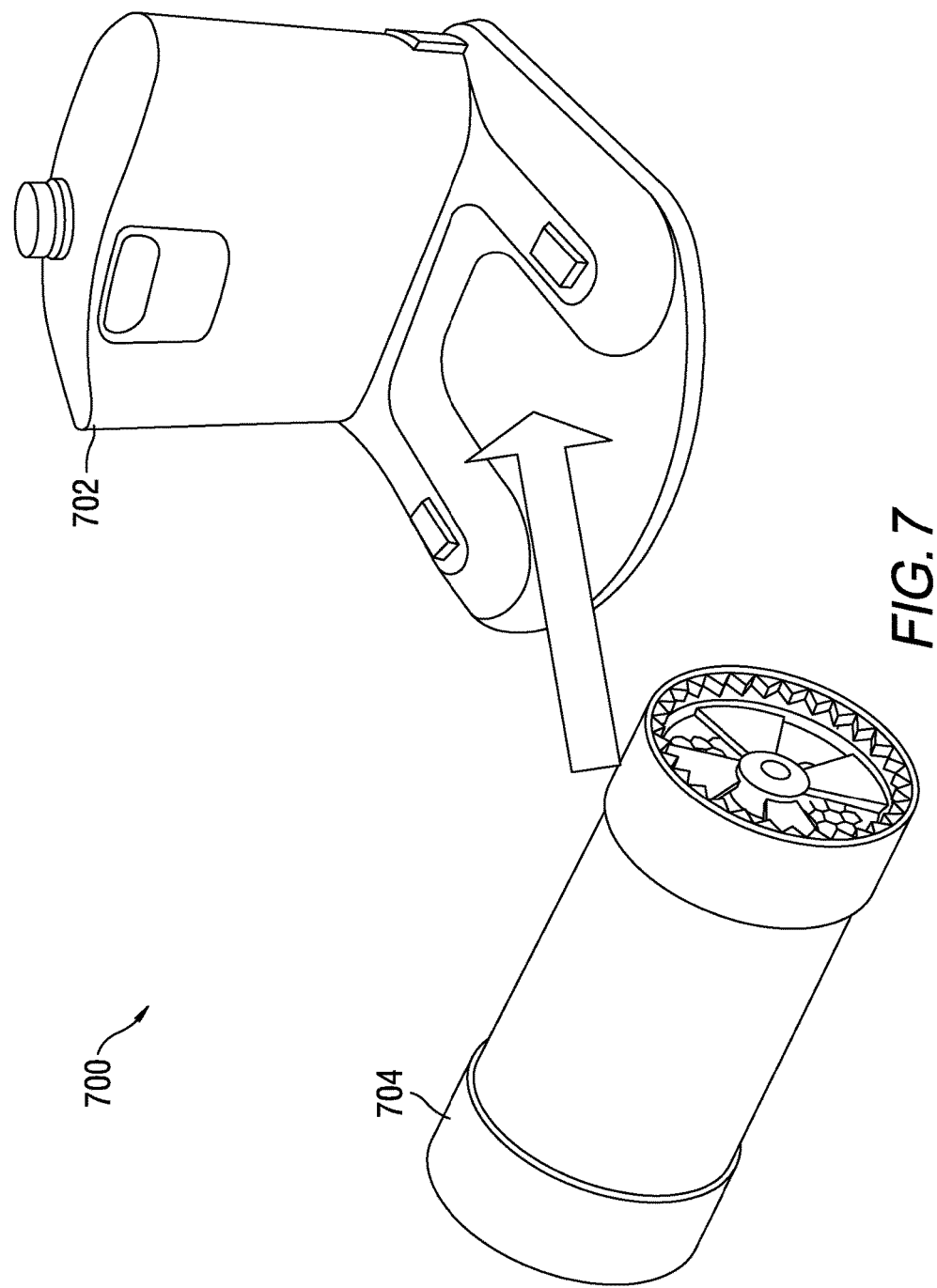
FIG. 7 is an exemplary illustration of an energy module at a charging station.

FIG. 7 is an exemplary illustration 700 of an energy module 704 navigating to a charging station 702. The charging station 702 can be at any type of public or private location, such as office buildings, gas stations, grocery stores, shopping malls, hotels, car dealers, mechanic garages, private residences, and the like. The charging station 702 can include an AC charging device that can charge various types of energy modules. For example, the energy module 704 can be one of the energy modules that provide power to a modular energy management system 100 of a vehicle, such as the vehicle 600 (FIG. 600). The charging station 702 can include a charging connector that attaches to the energy module 704. The charging station 702 can also be configured to wirelessly charge the energy module 704.

In response to receiving the disconnection signal and/or self-driving mode engagement signal from the central controller 128, the energy module 704 navigates to the charging station 702 and establishes a connection with the charging station 702 at a predetermined time. In some implementations, the energy module 704 navigates to the charging station 702 based on received location information, such as through a detected beacon signal output from the charging station 702. In some implementations, the cloud-based energy module monitoring system can communicate a charging connection time to the energy module 704 directly or via the central controller 128 of the modular energy management system 100. The charging connection time can correspond to a time where grid energy costs are lowest or less than a predetermined threshold cost. As will be discussed in further detail herein, the cloud-based energy module monitoring system receives energy grid cost information from locations of one or more charging stations and can determine time periods where a cost to charge the energy module 704 is lowest. Once charging operations are complete, the energy module 704 disconnects from the charging station and navigates to a predetermined location, such as back to the module chassis of the vehicle or to a module storage location.

Figure 8:
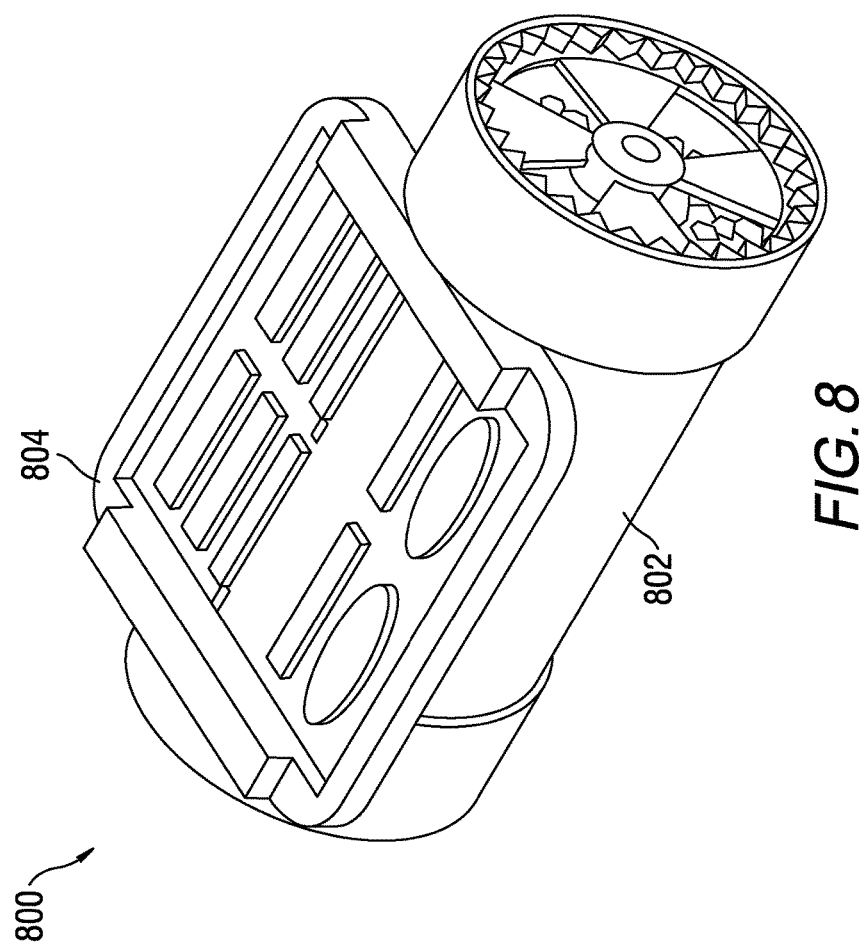
FIG. 8 is an exemplary illustration of an energy module application.

FIG. 8 is an exemplary illustration of an energy module application where an energy module 802 is used as a portable transportation device 800. In some implementations, the energy module 802 is an implementation of the energy module 200 (FIG. 2) that includes connectors that allow a footrest 804 to be detachably attached to the energy module 802 to form the portable transportation device 800, which provides increased functionality and usability of the energy module 802. For example, the energy module 802 can be disconnected from the modular energy management system 100 to operate as the portable transportation device 800. Connectors on the footrest 804 connect to the connectors of the energy module 802, which can be attached with screws or any other type of attachment mechanism.

When the energy module 802 is implemented as the portable transportation device 802, the local controller can control the energy module 802 in a transportation mode where the local controller controls the direction and speed of rotation of the rotation assemblies of the energy module 802 based on a received input. In some implementations, the footrest 804 can be electrically connected to the local controller of the energy module 802 and can also include pressure sensors that detect pressure from a person standing on the footrest. The local controller of the energy module 802 controls the speed and direction of travel of the portable transportation device 800 based on a change in pressure and a location of the pressure change. For example, the footrest 804 can include a pressure sensor on the right side and the left side of the footrest where a user places a right foot and a left foot, respectively. If a pressure increase is detected at the right pressure sensor, then the local controller turns the energy module 802 to the right. If the pressure increase is detected at the left pressure sensor, then the local controller turns the energy module 802 to the left. The local controller can modify the speed and/or direction of motion of the portable transportation device based on data received from other types of sensors connected to the footrest 804 as well as other types of received control signals. For example, a user of the portable transportation device 800 can use a remote control that is wirelessly connected to the local controller of the energy module 802 to issue steering and/or speed change commands to the energy module 802.

Figure 9:
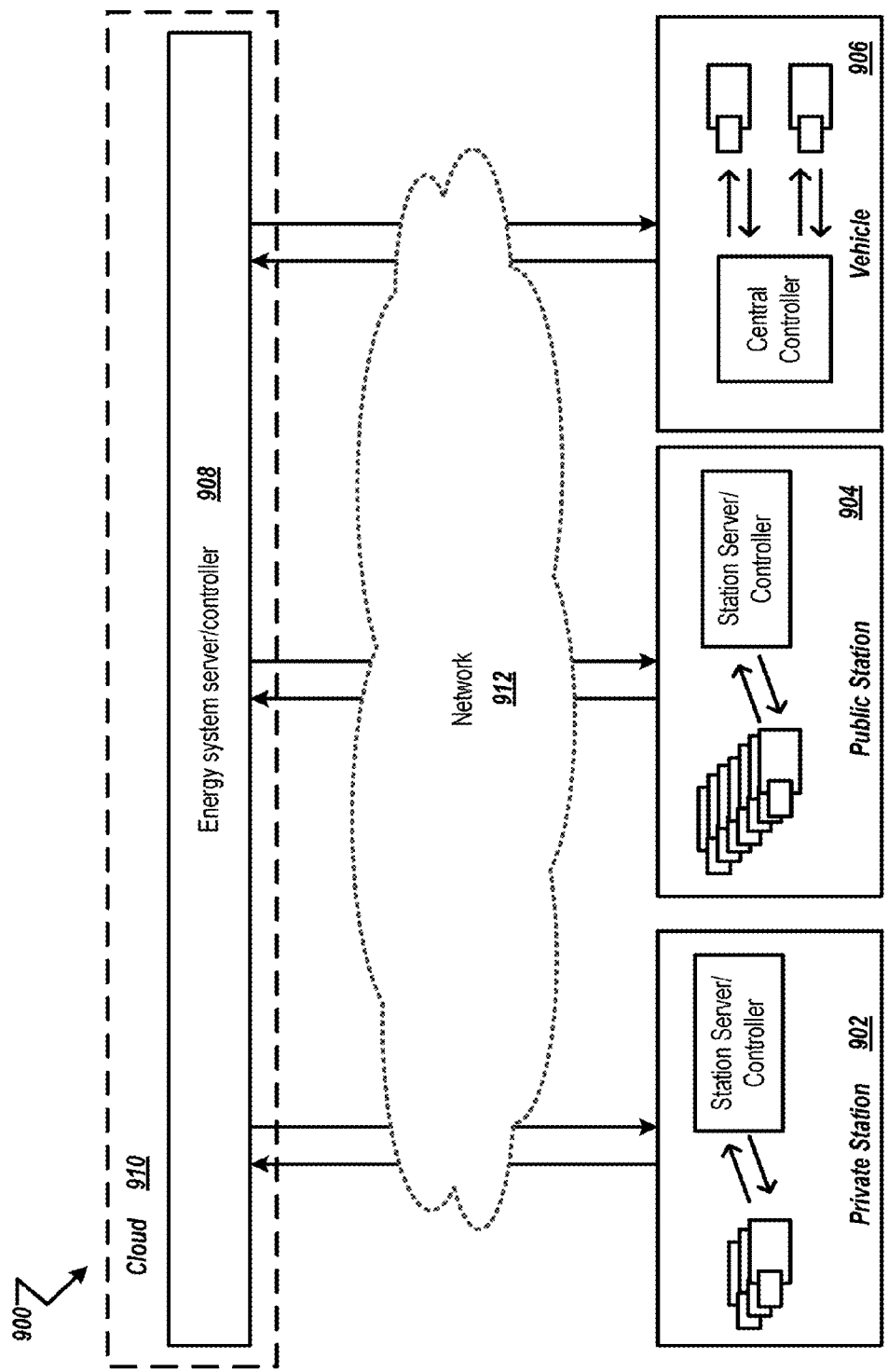
FIG. 9 is an exemplary diagram of a cloud-based energy module monitoring system.

FIG. 9 is an exemplary diagram of a cloud-based energy module monitoring system 900. The cloud-based energy module monitoring system 900 includes an energy system server/controller 908 that can be implemented in a cloud computing environment 910 in order to provide increased scalability of an amount of data processed by the energy system server/controller 908.

The cloud computing environment 910 may include one or more resource providers, such as the energy system server/controller 908. Each resource provider may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider may be connected to any other resource provider in the cloud computing environment 910. In some implementations, the resource providers may be connected over a network 912. Each resource provider may be connected to one or more computing devices over the network 912, which may can be a cellular communication network, satellite communication network, or any other type of wireless communication network. For example, the computing devices can include servers/controllers associated with one or more entities monitored and controlled by the energy system server/controller 908. For example, the one or more entities can include private stations 902, public stations 904, or vehicles 906. For example, the private stations 902 can include charging stations or module storage sites that are located at private residences or on other types of private property that may include office buildings or mechanic garages. The public stations 904 can include charging stations or module storage sites that are located at publicly accessible sites that may include gas stations, shopping malls, hotels, etc. The vehicles 906 can include any type of EV that includes the modular energy management system 100 (FIG. 1) or any other type of energy management that has power provided by one or more of the energy modules 200 (FIG. 2).

The cloud computing environment 910 may include a resource manager. The resource manager may be connected to the resource providers and the computing devices over the network 912. In some implementations, the resource manager may facilitate the provision of computing resources by one or more resource providers to the computing devices of the private stations 902, public stations 904, or vehicles 906. The resource manager may receive a request for a computing resource from a particular computing device. The resource manager may identify one or more resource providers capable of providing the computing resource requested by the computing device. The resource manager may select a resource provider to provide the computing resource. The resource manager may facilitate a connection between the resource provider and a particular computing device. In some implementations, the resource manager may establish a connection between a particular resource provider and a particular computing device. In some implementations, the resource manager may redirect a particular computing device to a particular resource provider with the requested computing resource.

In one implementation, the cloud computing environment 910 may include GOOGLE Cloud Platform™, Amazon Web Services™ (AWS) platform, or any other public or private cloud computing environment. The processes associated with monitoring and/or controlling the private stations 902, public stations 904, and vehicles 906 can be executed on a computation processor, such as the GOOGLE Compute Engine. The energy system server/controller 908 can also include an application processor, such as the GOOGLE App Engine, that can be used as the interface with the private stations 902, public stations 904, and vehicles 906 to receive status data about the energy modules and output location information regarding locations of charging stations with a predetermined type of energy module or updated operational specifications and procedures for the energy modules. The energy system server/controller 908 also includes one or more databases. In some implementations, the one or more databases include a cloud storage database, such as the GOOGLE Cloud Storage, which stores processed and unprocessed module status data The energy system server/controller 908 receives status data for the charging stations and energy modules associated with the private stations 902, public stations 904, or vehicles 906 that are connected to the energy system server/controller via the network 912. Each of the private stations 902, public stations 904, and vehicles 906 as well as the associated energy modules can be uniquely identified by the energy system server/controller 908 by a serial number or other unique identifier. The servers/controllers at the private stations 902 and public stations 904 collect energy module charging data, which can include module status data for the energy modules that are charged at the private stations 902, which is then transmitted to the energy system server/controller 908. The module status data and charging station status data can include dates and times of module charges, amount of time it takes to charge the energy modules, energy grid cost and usage information at the locations of the private stations 902 and public stations 904, measured sensor data (e.g., voltage, current, etc.) at the energy modules during charging, etc. The central controller 128 of the vehicles 906, which can be the central controller 128 described previously (FIG. 1) that collects energy module status data for the energy modules supplying power to the modular energy management system 100. The module status data can include load demands on each of the energy modules, module discharge rates, voltage and current sensor data for each of the energy modules, and any other data that indicates a SOC or SOH of the energy modules. In some implementations, the controller 210 (FIG. 2) of individual energy modules can communicate directly with the energy system server/controller 908 via the network 912.

The energy system server/controller 908 can determine statistics and operational recommendations or modifications for the energy modules associated with the private stations 902, public stations 904, and vehicles 906 based on the received module status data and charging station data. For example, the energy system server/controller 908 can process the module status data for millions of energy modules associated with the private stations 902, public stations 904, and vehicles 906 to identify manufacturing deficiencies by measuring variations in performance in energy modules manufactured at various times or manufacturing sites. The energy system server/controller 908 can also identify inefficiencies in software executed by the server/controllers of the private stations 902, public stations 904, and vehicles 906. In addition, the energy system server/controller 908 uses the energy grid cost and usage information at the locations of the private stations 902 and public stations 904 to determine locations for the vehicles 906 to drive to for module charging.

If the energy system server/controller 908 identifies deficiencies in one or more energy modules that indicate imminent failure or are not correctable without outside intervention, the energy system server/controller 908 can output warnings to the private stations 902, public stations 904, or vehicles 906 associated with the defective energy modules. In some implementations, if the detected deficiency indicates imminent failure of the one or more defective energy modules, the energy system server/controller 908 can output a control signal to immediately shutdown the defective energy modules by issuing a control signal to the local controller at the energy modules, via the controller/server at the private stations 902 or public stations 904, or via the central controller 128 of the vehicles 906.

Based on the calculated statistics, the energy system server/controller 908 can also output firmware/software updates for the energy modules or charging stations to the private stations 902, public stations 904, and vehicles 906 via the network 912 to improve performance and efficiency of the energy modules or charging stations. In some implementations, in response to receiving a module replacement signal from the central controller 128 of one of the vehicles 906, the energy system server/controller 908 can output a location of one of the public stations 904 that is closest to a location of the vehicle 906 and/or has one or more on-hand replacement modules that provides for a module replacement time that is less than a predetermined threshold time. The energy system server/controller 908 can also output a module charging time associated with the location of the public station 904 that corresponds to a time when the energy grid costs for the location are at a cost that is less than a threshold cost.

Figure 10:
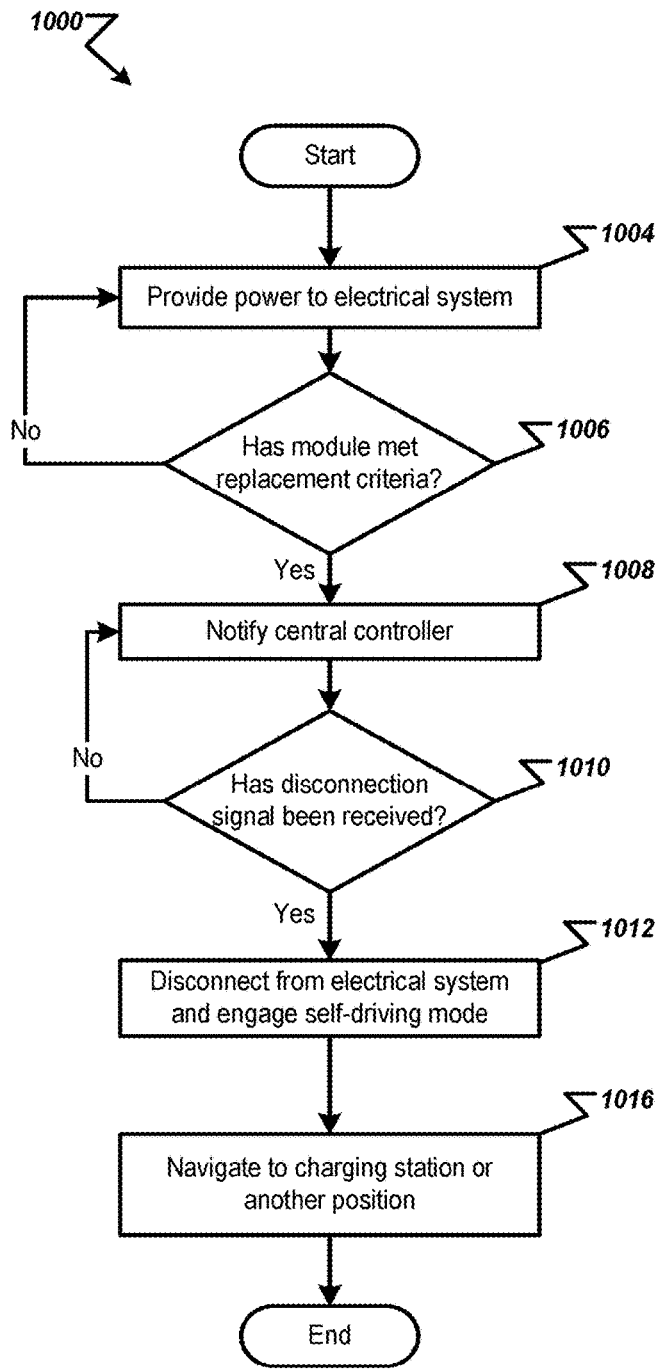
FIG. 10 is an exemplary flowchart of an energy module control process.

FIG. 10 is an exemplary flowchart of an energy module control process 1000. The energy module control process 1000 is described herein with respect to the modular energy management system 100 (FIG. 1), the energy module 200 (FIG. 2), and the vehicle 600 (FIG. 6) but can also be applied to other types of self-driving energy modules that can be independently controlled.

At step 1004, the energy module 200, which is an implementation of the battery module 122 in the modular energy management system 100, provides power to the energy management bus 126 to power one or more electrical loads. In some implementations, the amount of power output from the energy module 200 and rate of discharge are based on control signals received from the central controller 128 of the modular energy management system 100.

At step 1006, the controller 210 of the energy module 200 determines whether one or more predetermined replacement criteria have been met at the energy module. The predetermined replacement criteria can include a predetermined SOC threshold or SOH threshold. For example, the predetermined SOC threshold may be a percentage of full charge, such as 50%, 60%, or any other percentage value. If the controller 210 determines that the one or more replacement criteria have been met, resulting in a "yes" at step 1006, then step 1006, then step 1008 is performed. Otherwise, if the one or more replacement criteria have not been met, resulting in a "no" at step 1006, then the process returns to step 1004, and the energy module 200 continues to provide power to the energy management bus 126 of the modular energy management system 100.

At step 1008, the controller 210 outputs the replacement status signal to the central controller 128 when one or more of the predetermined replacement criteria have been met. In addition, the controller 210 can output the current status of the energy module 110 to the central controller 128 at a predetermined frequency, and the central controller 128 can determine when the predetermined replacement criteria are met.

At step 1010, the controller 210 determines whether a disconnection signal has been received from the central controller 128. If the disconnection signal has been received from the central controller 128, resulting in a "yes" at step 1010, then step 1012 is performed. Otherwise, if the disconnection has not been received from the central controller 128, resulting in a "no" at step 1010, then the process returns to step 1008.

At step 1012, in response to receiving the disconnection signal from the central controller 128, the energy module 200 electrically disconnects from the electric terminals 604 of the docking position in the module chassis 602 and engages the self-driving mode. When a self-driving mode of the energy module 200 is engaged, the controller 210 of the energy module 200 outputs a control signal that causes clutch mechanism 508b to connect the wheel assembly 510b to the motor 506b so that the energy module 200 moves as the motor 506b spins while fan 504b also rotates.

At step 1016, the energy module 200 navigates to a charging station or another docking position in the module chassis 602. In the navigation sub-mode of the self-driving mode, the controller 210 of the energy module 608 receives location information about the charging station or other predetermined location which the energy module 608 is navigating. The location information can include a detected beacon signal from the charging station that the energy module 608, a control signal received from the central controller 128 about the position of the charging station, and/or position coordinates of the charging station received from the central controller 128 or cloud-based energy module monitoring system. In some implementations, the local controller of the energy module includes positioning circuitry, such as a global positioning system (GPS) receiver that allows the local controller to determine the location of the charging station based on the received position coordinates. When the self-driving mode is engaged, the local controller issues control signals to the clutch mechanisms of the rotation assemblies (e.g., rotation assemblies 202 in FIG. 2) to connect the motor to the wheel assembly. The controller 210 also controls the speed and direction of rotation of each of the rotation assemblies in order to steer the energy module 608 to the charging station or other predetermined location.

Based on the configuration of the energy modules in the module chassis 602, one or more of the energy modules may have to be repositioned within the module chassis 602 in order to provide a path for another energy module to navigate out of the module chassis 602 or into a predetermined docking position in the module chassis 602. In response to receiving a repositioning control signal from the central controller 128, energy module 616 engages a repositioning sub-mode of the self-driving mode. While in the repositioning sub-mode, the energy module 616 exits the module chassis 602 via the driving surface provided by the door 610 and subsequently navigates back to a predetermined docking position in the module chassis 602 once the energy module 614 has exited the module chassis 602. The energy modules stored in the module chassis 602 can also be manually removed/disconnected or replaced/connected from the module chassis 602.

Figure 11:
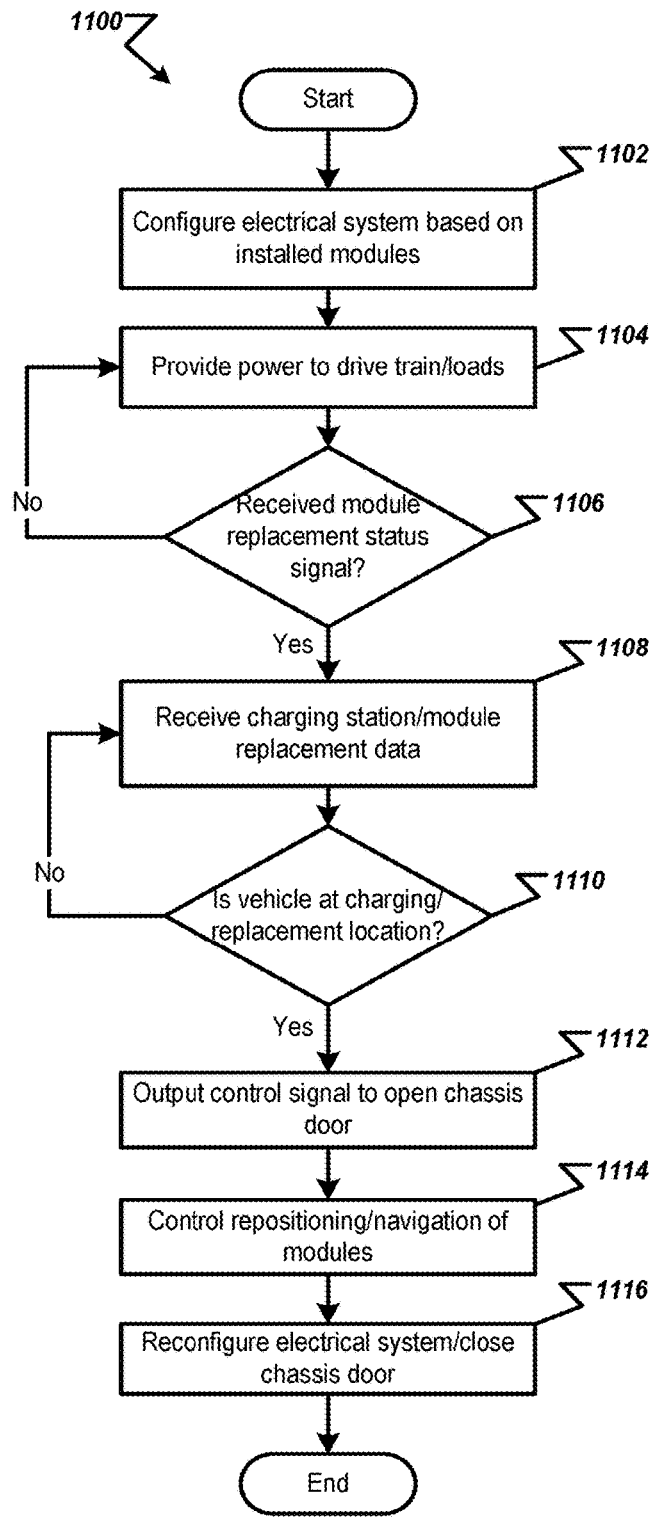
FIG. 11 is an exemplary flowchart of an energy management system control process.

FIG. 11 is an exemplary flowchart of an energy management system control process 1100. The energy management system control process 1100 is described herein with respect to the modular energy management system 100 (FIG. 1), the energy module 200 (FIG. 2), and the vehicle 600 (FIG. 6) but can also be applied to other types of self-driving energy modules that can be independently controlled.

At step 1102, the central controller 128 configures the modular energy management system 100 based on characteristics of the energy modules connected to the electric terminals in the docking stations of the module chassis 602. For example, the energy modules can include the battery modules 122 of the modular energy management system 100. At step 1104, the connected energy modules provide power to the vehicle drive train and various electrical loads of the modular energy management system 100.

At step 1106, the central controller 128 determines whether a replacement status signal has been received from one of the energy modules. If a replacement status signal has been received, resulting in a "yes" at step 1106, then step 1108 is performed. Otherwise, if a replacement status signal has not been received, resulting in a "no" at step 1106, then the process returns to step 1104.

At step 1108, the central controller 128 receives charging station/module replacement data from the energy system server/controller 908 of the cloud-based energy module monitoring system 900. For example, the charging station/module replacement data can include a position data indicating a location of a charging station that is closest to the vehicle with the energy module that has met the replacement criteria or has one or more on-hand modules that are compatible with the modular energy management system 100. In some implementations, the cloud-based energy module monitoring system 900 can also communicate a charging connection time that corresponds to a time where grid energy costs are lowest or less than a predetermined threshold cost.

At step 1110, the central controller 128 determines whether the vehicle 600 is at or within a predetermined distance of the charging station/module replacement location. For example, the central controller 128 determines that the vehicle 600 is at the charging station location based on a location signal received from a navigation system of the vehicle 600. If the vehicle 600 is at the charging station/module replacement location, resulting in a "yes" at step 1110, then step 1112 is performed. Otherwise, if the vehicle 600 is not at the charging station/module replacement location, resulting in a "no" at step 1110, then the process returns to step 1108.

At step 1112, the central controller 128 outputs a control signal to open the door 610 of the module chassis 602. The central controller 128 can output the control signal to engage an actuator to open the door 610 based on predetermined opening criteria. For example, the predetermined opening criteria can include receiving a module replacement signal from one of the energy modules, determining that the vehicle 600 is within a predetermined distance of a module charging/replacement station, and determining that the vehicle 600 is in a parked state or the engine is off, the central controller 128 issues a control signal to open the door 610 of the module chassis 602. When in an open position, the door 610 provides a driving surface between the module chassis 602 and a predetermined location for the one or more energy modules operating in the self-driving mode, such as a module charging/replacement station.

At step 1114, the central controller 128 controls the navigation of the energy modules between the module 602 chassis and the predetermined location as well as the repositioning of the energy modules. If energy module 606 (FIG. 6) has met the predetermined replacement criteria, the door 610 of the module chassis 302 is open, and the energy management system 100 has been configured for standby operations, the central controller 128 issues the disconnection signal to the energy module 606 along with a control signal to engage a self-driving mode in order to navigate to a charging station. In response to receiving the control signals, the energy module 606 disconnects from the energy management bus and engages the navigation sub-mode of the self-driving mode.

The central controller 128 also outputs a repositioning control signal to one or more energy modules in order to provide a path of travel for an energy module 614 being replaced. For example, in response to receiving the repositioning control signal, energy module 616 engages a repositioning sub-mode of the self-driving mode. While in the repositioning sub-mode, the energy module 616 exits the module chassis 602 via the driving surface provided by the door 610 and subsequently navigates back to a predetermined docking position in the module chassis 602 once the energy module 614 has exited the module chassis 602.

The energy module 612 (FIG. 6) represents an energy module operating in the self-driving mode that is navigating to one of the docking positions in the module chassis 602. For example, the energy module 612 may be a replacement energy module and/or charged energy module that is navigating to module chassis 602 from the charging station. The energy module 612 also navigates to the module chassis 602 based on received location information about the module chassis 602 and/or predetermined docking position to which the energy module 612 is assigned. In some implementations, the central controller 128 determines the predetermined docking position for the energy module 612 based on a current module status of other energy modules providing power to the energy management system 100 as well as power demands of the electrical loads supplied by the modular energy management system 100. When the predetermined docking position is determined, the central controller 128 outputs a control signal to trigger the electric terminals 604 of the predetermined docking position to output a beacon signal that is detected by the energy module 612. The local controller 210 of the energy module 612 controls navigation of the energy module 612 to the predetermined docking position based on the detected beacon signal from the electric terminals for the predetermined docking position.

At step 1116, the central controller 128 reconfigures the energy modules in the module chassis 602 for an operational mode and closes the door 610 of the module chassis 602. The central controller 128 outputs a control signal to engage an actuator to close the door 610 based on predetermined closing criteria. The predetermined closing criteria can include determining that a predetermined number of energy modules are in one or more of the docking positions and are electrically connected to the energy management bus via the electric terminals 604.

Figure 12:
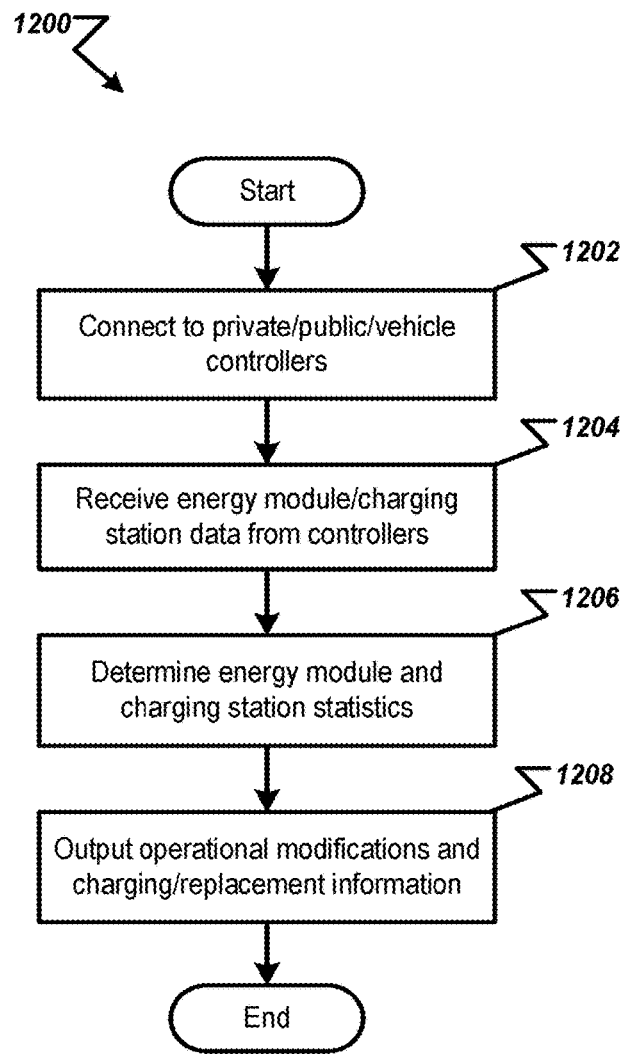
FIG. 12 is an exemplary flowchart of an energy module monitoring system control process.

FIG. 12 is an exemplary flowchart of an energy module monitoring system control process 1200. The energy module monitoring system control process 1200 is described herein with respect to the cloud-based energy module monitoring system 900 (FIG. 9), but can also be applied to other types and configurations of energy module monitoring systems.

At step 1202, the energy system server/controller 908 connects to one or more computing devices associated with the private stations 902, public stations 904, and/or vehicles 906 via the network 912, which may be a cellular communication network, satellite communication network, or any other type of wireless communication network. For example, the computing devices can include servers/controllers associated with one or more entities monitored and controlled by the energy system server/controller 908. When the connection between private stations 902, public stations 904, and/or vehicles 906 and the energy system server/controller 908 is established, the energy system server/controller 908 identifies the computing devices and associated energy modules based on a unique identifier, such as a serial number.

At step 1204, the energy system server/controller 908 receives status data for the charging stations and energy modules associated with the private stations 902, public stations 904, or vehicles 906 that are connected to the energy system server/controller via the network 912. Each of the private stations 902, public stations 904, and vehicles 906 as well as the associated energy modules can be uniquely identified by the energy system server/controller 908 by a serial number or other unique identifier. The servers/controllers at the private stations 902 and public stations 904 collect energy module charging data, which can include module status data for the energy modules that are charged at the private stations 902, which is then transmitted to the energy system server/controller 908. The module status data and charging station status data can include dates and times of module charges, amount of time it takes to charge the energy modules, energy grid cost and usage information at the locations of the private stations 902 and public stations 904, measured sensor data (e.g., voltage, current, etc.) at the energy modules during charging, etc. The central controller of the vehicles 906, which can be the central controller 128 described previously (FIG. 1) that collects energy module status data for the energy modules supplying power to the modular energy management system 100. The module status data can include load demands on each of the energy modules, module discharge rates, voltage and current sensor data for each of the energy modules, and any other data that indicates a SOC or SOH of the energy modules. In some implementations, the controller 210 (FIG. 2) of individual energy modules can communicate directly with the energy system server/controller 908 via the network 912.

At step 1206, the energy system server/controller 908 determines statistics and operational recommendations or modifications for the energy modules associated with the private stations 902, public stations 904, and vehicles 906 based on the received module status data and charging station data. For example, the energy system server/controller 908 can process the module status data for millions of energy modules associated with the private stations 902, public stations 904, and vehicles 906 to identify manufacturing deficiencies by measuring variations in performance in energy modules manufactured at various times or manufacturing sites. The energy system server/controller 908 can also identify inefficiencies in software executed by the server/controllers of the private stations 902, public stations 904, and vehicles 906. In addition, the energy system server/controller 908 uses the energy grid cost and usage information at the locations of the private stations 902 and public stations 904 to determine locations for the vehicles 906 to drive to for module charging.

At step 1208, the energy system server/controller 908 outputs operational modifications and/or charging/replacement information to the private stations 902, public stations 904, and vehicles 906. For example, if the energy system server/controller 908 identifies deficiencies in one or more energy modules that indicate imminent failure or are not correctable without outside intervention, the energy system server/controller 908 can output warnings to the private stations 902, public stations 904, or vehicles 906 associated with the defective energy modules. In some implementations, if the detected deficiency indicates imminent failure of the one or more defective energy modules, the energy system server/controller 908 can output a control signal to immediately shutdown the defective energy modules by issuing a control signal to the local controller at the energy modules, via the controller/server at the private stations 902 or public stations 904, or via the central controller of the vehicles 906.

Based on the calculated statistics, the energy system server/controller 908 can also output firmware/software updates for the energy modules or charging stations to the private stations 902, public stations 904, and vehicles 906 via the network 912 to improve performance and efficiency of the energy modules or charging stations. In some implementations, in response to receiving a module replacement signal from the central controller of one of the vehicles 906, the energy system server/controller 908 can output a location of one of the public stations 904 that is closest to a location of the vehicle 906 and/or has one or more on-hand replacement modules that provides for a module replacement time that is less than a predetermined threshold time. The energy system server/controller 908 can also output a module charging time associated with the location of the public station 904 that corresponds to a time when the energy grid costs for the location are at a cost that is less than a threshold cost.

Aspects of the present disclosure are directed to a modular energy management system that includes lightweight, self-driving energy modules that are able to independently navigate to charging stations or other locations. The energy modules described herein are significantly improved over energy modules used in HV's that are heavy and require manual installation and replacement. The modularity of the energy modules and the adaptability of the modular energy management system also allows for interchangeability with other energy modules that are compatible with the modular energy management system. In addition, the energy modules can be used in multiple types of charging and transportation applications.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 13:
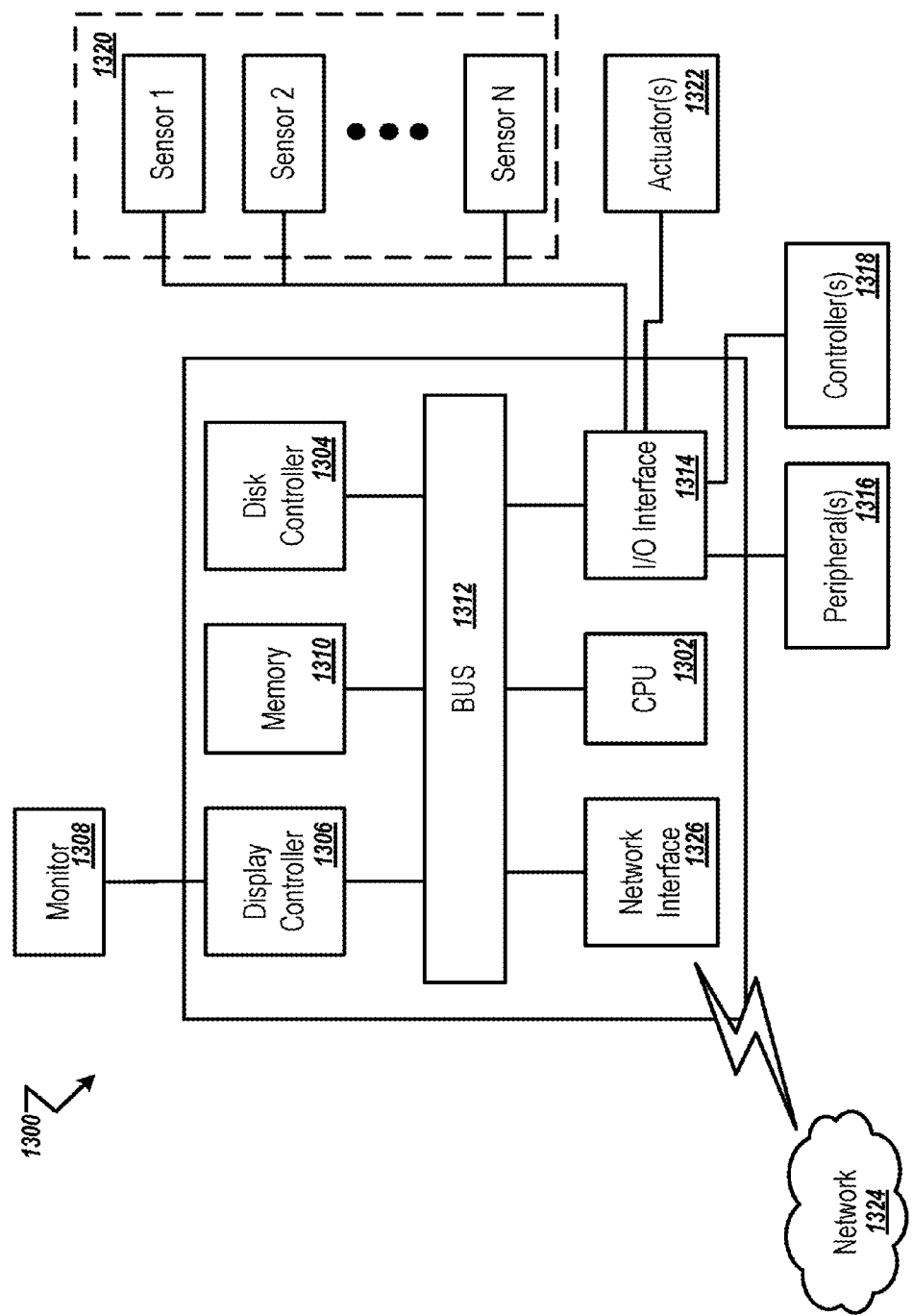
FIG. 13 schematically illustrates a processing system, such as a controller and/or a computer system.

FIG. 13 illustrates an exemplary processing system 1300 (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle or as a server in a cloud computing environment. For example, the processing system 1300 can be the controller 210 in one of the energy modules, the central controller 128 of the modular energy management system 100, or a server/controller of the private stations 902 or public stations 904. The processing system 1300 can also be the energy system server/controller 908 of the cloud-based module monitoring system 900.

The exemplary processing system 1300 can be implemented using one or more microprocessors or the equivalent, such as a central processing unit (CPU) 1302 and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller 1304, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU 1302. Control circuitry provided by one or more processors in a multi-processing arrangement may also be employed to execute sequences of instructions contained in memory 1310. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller 1306 to a monitor 1308. The display controller 1306 preferably includes at least one graphic processing unit, which can be provided by a plurality of graphics processing cores, for improved computational efficiency. The display controller 1306 or portions thereof can also be incorporated into the CPU 1302. Additionally, an I/O (input/output) interface 1314 is provided for inputting signals and/or data from a microphone, speakers, cameras, a mouse, a keyboard, a touch-based display or pad interface, etc., which can be connected to the I/O interface as a peripheral 1316. For example, a keyboard or a pointing device for controlling parameters of the various processes or algorithms of this disclosure can be connected to the I/O interface to provide additional functionality and configuration options, or control display characteristics. Moreover, the monitor 1308 can be provided with a touch-sensitive or gesture-detecting interface for providing a command/instruction interface.

In an exemplary implementation, the I/O interface is provided for inputting sensor data from Sensors 1, 2 . . . N 1320. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers 1318 that enable a user to control the configuration of the modular energy management system 100. For example, the user can use the controller 1318 to select energy modules to provide power to one or more auxiliary electrical loads when the modular energy management system is in standby mode. The I/O interface can also provide an interface for outputting control signals to one or more actuators 1322 to control various actuated components, including DC-DC conversion circuitry and other circuitry in the modular energy management system 100. In some implementations, the actuators 1320 send control signals to align the clutch mechanisms of the rotation assemblies 202 to connect the wheel assemblies 214 to the motor 208 of the energy module 200.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network 1324, such as the Internet or a local intranet, via a network interface 1326 for the transmission or reception of data, including controllable parameters. The network interface 1326 can include one or more IEEE 802 compliant circuits. A central bus 1312 is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory 1310 and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:
one or more energy modules configured to output power to an energy management bus based on load demands wherein an energy module of the one or more energy modules includes
one or more energy cells connected in a series-parallel combination and enclosed within a module housing configured to provide the power to the energy management bus,
a first rotation assembly and a second rotation assembly attached on opposite ends of the module housing that are configured to provide rotational movement for the energy module, and
a local controller with first circuitry configured to
control an amount of power output from the one or more energy cells to the energy management bus,
engage a self-driving mode of the energy module in response to receiving a disconnection signal from a central controller, and
control movement of the energy module in the self-driving mode to a predetermined location via the first rotation assembly and the second rotation assembly; and
the central controller including second circuitry configured to
receive a current module status from the one or more energy modules, and
control a configuration of the one or more energy modules providing power to the energy management bus based on the current module status,
wherein the first rotation assembly and the second rotation assembly include:
a motor configured to receive electrical power from the one or more energy cells;
one or more devices coupled to the motor that are configured to rotate in response to rotation of the motor; and
wherein one of the one or more devices is a wheel assembly that is detachably coupled to the motor via a clutch mechanism configured to provide the rotational movement of the energy modules in response to the rotation of the motor, another one of the one or more devices being a fan to cool the one or more energy cells.

2. The system of claim 1, wherein the first circuitry is further configured to disconnect the wheel assembly from the motor via the clutch mechanism when the energy module is not in the self-driving mode.

3. The system of claim 1, wherein the first circuitry is further configured to output a replacement status signal to the central controller in response to determining that current module status of the energy module meets one or more replacement criteria.

4. The system of claim 3, wherein the one or more replacement criteria include at least one of a predetermined state of charge (SOC) threshold or a predetermined state of health (SOH) threshold for the one or more energy cells.

5. The system of claim 1, wherein the first circuitry is further configured to engage a navigation sub-mode of the self-driving mode wherein the first circuitry is further configured to navigate the energy module to the predetermined location that corresponds to a charging station location.

6. The system of claim 5, wherein the first circuitry is further configured to determine the charging station location based on location data received from the second circuitry of the central controller.

7. The system of claim 5, wherein the first circuitry is further configured to determine the charging station location based on a beacon signal received from the charging station.

8. The system of claim 1, further comprising a module chassis configured to hold the one or more energy modules at one or more docking positions within the module chassis.

9. The system of claim 8, wherein the one or more docking positions include at least one electrical terminal configured to electrically connect the one or more energy modules to the energy management bus.

10. The system of claim 9, wherein the at least one electrical terminal includes a wireless power transceiver configured to wirelessly transfer power between the one or more energy modules and the energy management bus.

11. The system of claim 8, wherein the second circuitry of the central controller is further configured to control a position of a door of the module chassis.

12. The system of claim 11, wherein the second circuitry is further configured to output the disconnection signal to the one or more energy modules in response to determining that the door of the module chassis is in an open position.

13. The system of claim 12, wherein the door of the module chassis is configured to provide a driving surface between the module chassis and the predetermined location for the one or more energy modules operating in the self-driving mode when the door is in an open position.

14. The system of claim 8, wherein the first circuitry of an energy module of the one or more energy modules in a first docking position of the one or more docking positions is further configured to engage a repositioning sub-mode of the self-driving mode wherein the first circuitry is further configured to navigate the energy module to the predetermined location that corresponds to a second docking position within the module chassis.

15. The system of claim 14, wherein the first circuitry is further configured to navigate the energy module to the second docking position within the module chassis based on a beacon signal received from the second docking position.

16. The system of claim 1, wherein the second circuitry is further configured to determine the predetermined location to which the energy module navigates based on charging/replacement location information received from a cloud-based energy module monitoring system.

17. The system of claim 1, wherein the second circuitry is further configured to output firmware updates to the one or more energy modules in response to receiving the firmware updates from a cloud-based energy module monitoring system.

18. A method comprising:
controlling, via first circuitry of a local controller, an amount of power output from one or more energy cells connected in a series-parallel combination and enclosed within a module housing of an energy module of one or more energy modules to an energy management bus of an electrical system;
engaging, via the first circuitry, a self-driving mode of the energy module in response to receiving a disconnection signal from a central controller;
controlling, via the first circuitry, movement of the energy module in the self-driving mode to a predetermined location via a first rotation assembly and a second rotation assembly attached on opposite ends of the module housing that are configured to provide rotational movement for the energy module;

receiving, at second circuitry of the central controller, a current module status from the one or more energy modules; and controlling a configuration of the one or more energy modules providing power to the energy management bus based on the current module status received from the one or more energy modules, wherein the first rotation assembly and the second rotation assembly include a motor configured to receive electrical power from the one or more energy cells, and the method further comprises rotating one or more devices coupled to the motor in response to rotation of the motor, and wherein one of the one or more devices is a wheel assembly that is detachably coupled to the motor via a clutch mechanism configured to provide the rotational movement of the energy modules in response to the rotation of the motor, another one of the one or more devices being a fan to cool the one or more energy cells.

19. An energy module comprising:

one or more energy cells connected in a series-parallel combination and enclosed within a module housing configured to provide power to an energy management bus;

a first rotation assembly and a second rotation assembly attached on opposite ends of the module housing that are configured to provide rotational movement for the energy module; and a local controller with first circuitry configured to control an amount of power output from the one or more energy cells to the energy management bus, engage a self-driving mode of the energy module in response to receiving a disconnection signal from a central controller, and control movement of the energy module in the self-driving mode to a predetermined location via the first rotation assembly and the second rotation assembly, wherein the first rotation assembly and the second rotation assembly include:

a motor configured to receive electrical power from the one or more energy cells;

one or more devices coupled to the motor that are configured to rotate in response to rotation of the motor; and wherein one of the one or more devices is a wheel assembly that is detachably coupled to the motor via a clutch mechanism configured to provide the rotational movement of the energy modules in response to the rotation of the motor, another one of the one or more devices being a fan to cool the one or more energy cells.

* * * * *